Sept. 14, 1926.  
E. AUDET  
1,599,547  
RAILWAY CAR WHEEL  
Filed Sept. 29, 1925
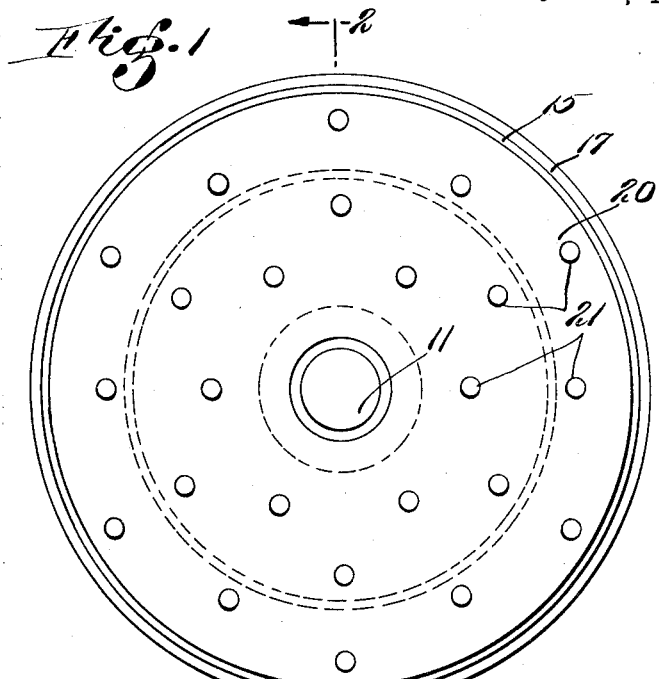
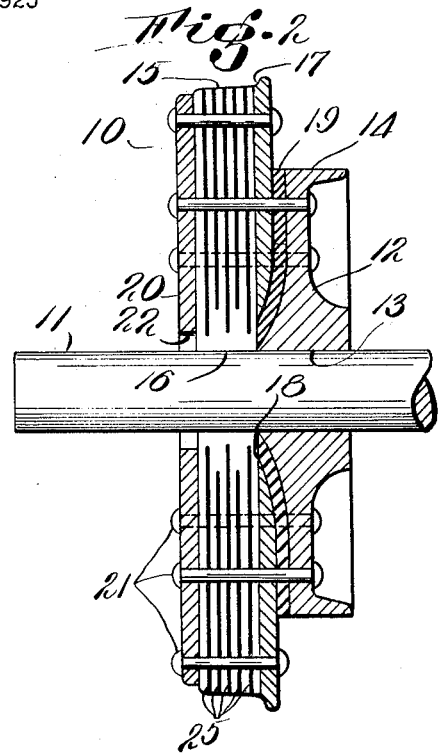
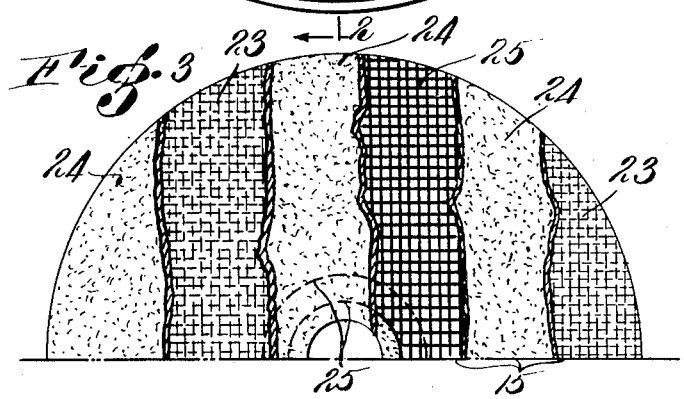
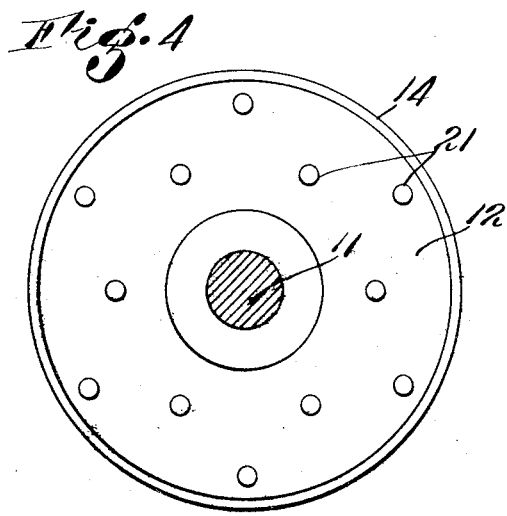
Inventor:  
Eugene Audet,  
By Justin S. Hearing,  
Attorney.

Patented Sept. 14, 1926.

1,599,547

UNITED STATES PATENT OFFICE.

EUGENE AUDET, OF CAMBRIDGE, MASSACHUSETTS.

RAILWAY-CAR WHEEL.

Application filed September 29, 1925, Serial No. 59,411, and in Canada July 2, 1925.

This invention relates to railway car wheels and particularly to car wheels of the kind adapted to minimize vibrations and sounds incident to their operation.

Heretofore, various forms of car wheels have been designed with the intention of cushioning the wheels against undesired vibrations. These wheels, however, are unsatisfactory owing to impractical construction or poor performance. These difficulties may be due to one or more of the following causes: the fact that the material composing the cushioning material is unsuited to resist the wear and strain encountered in use; that the flange is rigidly connected with the axle in such a manner that undesired vibrations are produced by contact between the flange and the rail; that the wheel is of prohibitively complicated construction and lacks the strength and cushioning characteristics desired for commercial operation.

In many instances the cushioning material proposed to be used is so brittle as to chip and fracture when subjected to normal operational shocks and strains. In some designs, the texture of the cushioning material is of such a character as to wear unequally at different points on the tread causing excessive vibration due to eccentricity of the wheel after wear. In other forms of wheels the cushioning arrangement is of such readily yieldable material that it is unserviceable to adequately support the load of a car when supported on wheels on standard sizes of rails.

Objects of the present invention are to avoid the difficulties mentioned above; to provide a railway car wheel of simple and efficient construction for reducing undesired vibrations causing sound or other disturbances while the wheel is in operation; to support the flange of the wheel in such a manner as to reduce the vibrations of the wheel arising therefrom; to provide an efficient form of cushion tread for car wheels; and generally to improve the construction and operation of car wheels of the kind referred to.

In accordance with one aspect of the present invention, a car wheel is provided with a cushion tread at one side of which is a flange arranged in such a manner that a minimum amount of undesired vibration is transmitted therefrom to the wheel. The wheel is preferably composed of a plurality of disks secured together coaxially with the wheel axle. One of the disks provides an elastic tread at its periphery. A disk adjacent the tread disk forms a flange therefor. The flange is non-rigidly held in place by cushioning means on each side thereof. The adjacent or superposed disks of the wheel are secured together, one of them being rigidly fixed on the axle while the others are non-rigidly related to the axle so that a very slight motion of the disks is possible relatively to the axle whereby undesired vibrations are suitably cushioned without being transmitted thereto. One of the disks, preferably the one rigidly fixed to the axle, is provided with a surface at its periphery for the application of brakes.

The cushion tread for the wheel may be constructed in the form of a disk of rubber or other suitable elastic material containing reinforcing elements arranged in spaced radial planes, a hole being provided at the centre of the disk for the axle. These elements help to stiffen the tread disk, but are sufficiently yieldable and are so disposed as to prevent transmission of undesired vibrations from the periphery to the center of the disk. They may be constructed as woven fabric laminations embedded in the material of the disk which serves as a binder therefor. Alternate laminations may be of non-metallic fabric while intervening laminations are of metallic fabric. The non-metallic fabric preferably extends throughout a radial plane in the disk, the metallic fabric extending radially from the periphery of the disk toward the centre and terminating short of the central termination of the non-metallic fabric, that is, short of the hole at the centre of the disk. Alternate metallic laminations may be longer in their radial dimensions than intervening laminations, the resulting structure being adapted to prevent the transmission of vibrations to the axle of the wheel. The peripheral and other portions of the disk may be stiffened and made more resistant to wear and deterioration by embedding powdered hard, wear resisting material, such, for example, as titanium-iron in the rubber or other binding material of the disk. The stiffness of the disk may be further controlled by the amount of compression to which it is subjected during manufacture and to which it is subjected by the adjacent disks after assembly of the wheel.

These and other features and objects are referred to in more detail in the following description in connection with the accompanying drawings, in which:—

Fig. 1 is a side elevation of a car wheel;
Fig. 2 is a section taken on line 2—2 of Fig. 1;
Fig. 3 is a side view of one half of the cushion tread disk of a wheel showing portions of successive layers torn away to expose the interior construction;
Fig. 4 is a side elevation of the main disk for securing the wheel to the axle; and
Fig. 5 is a radial section of the disk employed for cushioning the flange of the wheel.

Referring to the drawings, the wheel 10 is made up of a plurality of disk like elements secured together side by side on the wheel axle 11. The main supporting disk 12 is made fast to axle 11 by friction between the disk and the axle at portion 13, or by other well known suitable means. A cylindrical surface 14, at the periphery of disk 12, forms a drum to which brakes may be applied for reducing the rotation of the wheel. The thickness of disk 12 is preferably greater at its centre than in the neighborhood of the periphery in order to provide adequate rigidity and strength without involving objectionable weight or moment of inertia.

The tread disk 15, having a hole 16 at its centre closely fitting axle 11, consists of material of such character and arrangement as to provide the desired cushioning effect between the rail and axle 11 when the wheel is in operation. Flange disk 17, disposed at one side of tread disk 15, is of greater diameter than the tread disk so that its rim extends radially beyond that of the tread disk similarly to the flange of an ordinary car wheel. A central hole 18 in disk 17 is of larger diameter than axle 11, so that the disk is suitably spaced from the axle to permit the insertion therebetween of cushioning means to prevent the transmission of vibrations to the axle. A cushioning disk 19 is preferably provided between flange disk 17 and main disk 12 for insulating disks 12 and 17 with respect to vibrations which tend to be transmitted therebetween. The thickness of disk 17 around hole 18 may be tapered toward the centre of the disk to simplify the arrangement of cushioning disk 19.

Clamping disk 20 presses firmly against one side of tread disk 15, the bolts, rivets or other suitable means 21 being provided between disks 12 and 20, and between disks 20 and 17 for securing the disks together under the desired pressure. These bolts may be disposed in concentric rows substantially equally spaced from each other in any given row, and preferably staggered with respect to each other in adjacent concentric rows, as shown in Fig. 1, for example. The disk 20 is preferably of somewhat smaller diameter than tread disk 15, so that the rim of disk 15 projects over that of disk 20 and is thus free to be deformed in response to uneven rail conditions, without danger of direct contact between disk 20 and the rail. The hole 22 in disk 21 is made sufficiently large to provide a space between the disk and axle 11, so that the disk may vibrate without danger of transmission of vibrations to the axle.

The peripheral surface of disk 15 may correspond with that of the usual form of standard commercial railway car wheel or may be of any other desired form. The rim of flange disk 17 is preferably tapered radially outward in well known form so that it cooperates most effectively in limiting axial movement of the wheel and offers a minimum resistance to travel of the wheel at curves and other parts of the track.

Tread disk 15 is composed of laminations 23 of cotton, linen or other suitably strong non-metallic fabric disposed in radial planes and embedded or molded in an elastic medium 24, such as rubber or other suitably elastic material capable of binding the laminations together in a coherent elastic mass. Between alternate laminations 23 are positioned laminations 25, preferably of metallic fabric; that is, a fabric of woven metallic wires. The strands or wires from which fabrics 23 and 25 are woven may be of any suitable diameter and the fabrics may have any suitable weave, such that the disk may be used on standard sizes of rails and may stand the loads and operational strains to which it is subjected when in service.

Non-metallic laminations 23 preferably extend throughout a given radial plane of the disk, whereas metallic laminations 25 in any given plane extend radially from the periphery toward the centre of the disk and terminate short of the central termination of the non-metallic laminations 23 at the central hole 16 of the disk. Alternate metallic laminations 25 are longer in their radial dimensions than intervening metallic laminations, as shown by the sectional view in Fig. 2 and by dotted lines at the centre of the disk, Fig. 3. The metallic laminations are stiffer than the non-metallic laminations and thus contribute more to the stiffness of the disk. An annular portion of the disk 15, adjacent the tread may be reinforced and stiffened, and the wear resisting properties of the disk may be increased by incorporating titanium-iron powder in the elastic medium of the disk which acts as a binder throughout which is distributed the powder. Other suitable powder, made up of extremely hard, tough particles, may be substituted for the titanium-iron and, if desired, the powder may be distributed throughout the mass of the entire disk instead of merely in the portion at the treading surface.

Disk 19, disposed between flange disk 17 and main disk 12 on the side of the flange disk remote from elastic tread disk 15, preferably has a laminated structure, as shown in Fig. 5. Disk 19 may be normally flat before assembling with the other disks of the wheel or may be initially formed as shown in Fig. 2. Laminations 26, of non-metallic woven fabric, similar in character to laminations 23 of disk 15 are embedded or molded in rubber or other suitable elastic material which functions as an elastic binder for the laminations, the fabric laminations serving as reinforcement for the disk and giving it adequate stiffness as well as strength.

A wheel designed in accordance with the present invention is particularly suited for reducing and eliminating vibration or noise incident to the operation of ordinary railway car wheels. Vibrations and sounds arising at the wheel tread and at the flange tend to be absorbed or are otherwise suppressed so that they are not transmitted to the wheel axle with appreciable or objectionable amplitude.

The laminated construction of disks 15 and 19 renders them particularly resistant to tearing, abrasion, wear and damage due to shearing and other forces encountered under service conditions. The construction of tread disk 15 is such that the wheel is adapted for long usage when subjected to shocks, abrasion, shearing forces and friction at curves, crossovers, rail joints and other sources of vibrational disturbances in railway tracks.

Various changes in the relative dimensions of the tread disk and of the other disks and in the forms and arrangements of the disks will be apparent to one skilled in the art without departing from the principles of the present invention. It is to be understood that the specific form of wheel described in detail is merely illustrative of one among many possible embodiments which are contemplated by this invention, it being impractical to describe each species in detail. The patentable features of the invention are set forth in the appended claims.

I claim:—

1. In a railway car wheel, a cushion disk for treading on the rail, said disk comprising an elastic material containing substantially radial reinforcing laminations of fabric embedded therein, a metallic flange at one side of said tread disk, and means for securing said parts together.

2. In a railway car wheel, a cushion disk for treading on the rail, said disk comprising an elastic material containing substantially radial reinforcing laminations embedded therein, alternate laminations being of different character from that of intervening laminations, a metallic flange at one side of said tread disk, and means for securing said parts together.

3. A cushion tread disk for a railway car wheel, comprising an elastic material containing substantially radial reinforcing laminations embedded therein, alternate laminations being composed of non-metallic fabric extending from the periphery to a central hole in the disk, intervening laminations being composed of metallic fabric extending from the periphery toward the center of the disk and terminating short of the central hole therein.

4. A cushion tread disk for a railway car wheel, comprising an elastic binder containing substantially radial reinforcing laminations embedded therein, alternate laminations being composed of non-metallic fabric extending from the periphery toward a central hole in the disk, intervening laminations being composed of metallic fabric extending from the periphery toward the center of the disk and terminating short of the central hole therein, alternate metallic laminations having a different radial dimension from that of intervening metallic laminations.

5. A cushion tread disk for a car wheel, comprising an elastic binder containing substantially radial reinforcing laminations embedded therein, alternate laminations being composed of non-metallic fabric and intervening laminations being composed of metallic fabric.

6. A cushion tread disk for a car wheel, comprising an elastic material having powdered titanium-iron distributed therein.

7. A cushion tread element for a car wheel, comprising a coherent elastic disk having an annular peripheral portion containing powdered titanium-iron distributed therein, the central portion of the disk having substantially none of said powder therein.

8. In a railway car wheel, a cushion disk for treading on the rail, a flange disk at one side of said tread disk, cushioning means at the side of said flange disk remote from said tread disk, and means at opposite sides of the resulting group of adjacent parts and extending between said sides for securing said parts together.

9. In a railway car wheel, a cushion element for treading on the rail, said element being composed of material having substantially radial laminations embedded therein, a metallic flange at one side of said tread element, a cushion on the side of said flange remote from said tread element, and means at opposite sides of the resulting group of adjacent parts and extending between said sides for securing said parts together.

10. In a railway car wheel, a cushion disk for treading on the rail, a flange disk at one side of said tread disk, cushioning means of different character from that of said tread disk on the side of said flange disk remote from said tread disk, and means at opposite sides of the resulting group of adjacent parts and extending between said sides for securing said parts together.

11. In combination, a car wheel axle, a wheel mounted thereon composed of a plurality of disks secured together coaxially with said axle, one of said disks having a cushion portion for treading on the rail, a flange disk adjacent thereto, another of said disks being secured to said axle, all but said last mentioned disk being non-rigidly related to said axle.

12. In combination, a car wheel axle, a main disk fast thereto, a cushion disk for treading on the rail, a flange disk spaced from said axle and disposed between said cushion and main disks, cushioning means between said flange and main disks, and means for securing said disks together.

13. In combination, a car wheel axle, a main disk fast thereto having a brake element at the periphery thereof, a cushion disk for treading on the rail, a flange disk spaced from said axle and disposed between said cushion and main disks, cushioning means between said flange and main disks, and means for securing said disks together.

In witness whereof I hereunto subscribe my signature this 24th day of September, 1925.

EUGENE AUDET.